United States Patent
Kasuga

(10) Patent No.: US 7,640,425 B2
(45) Date of Patent: Dec. 29, 2009

(54) DISK APPARATUS AND ELECTRONIC APPARATUS

(75) Inventor: Kazunori Kasuga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 532 days.

(21) Appl. No.: 11/650,690

(22) Filed: Jan. 5, 2007

(65) Prior Publication Data
US 2008/0040595 A1 Feb. 14, 2008

(30) Foreign Application Priority Data
Aug. 9, 2006 (JP) .............................. 2006-216824

(51) Int. Cl.
*G06F 9/24* (2006.01)
(52) U.S. Cl. ........................... 713/1; 711/113; 711/141; 714/36; 713/2
(58) Field of Classification Search ...................... 713/1, 713/2; 711/113, 141; 714/36
See application file for complete search history.

(56) References Cited

U.S. PATENT DOCUMENTS

| 5,581,785 | A | | 12/1996 | Nakamura et al. | |
|---|---|---|---|---|---|
| 5,872,967 | A | * | 2/1999 | DeRoo et al. ................... | 713/2 |
| 6,981,136 | B2 | * | 12/2005 | Fuse et al. ...................... | 713/2 |
| 7,197,634 | B2 | * | 3/2007 | Kruger et al. ................... | 713/1 |
| 7,225,327 | B1 | * | 5/2007 | Rasmussen et al. ............ | 713/2 |
| 7,340,593 | B2 | * | 3/2008 | Martin ........................... | 713/1 |
| 2003/0061603 | A1 | * | 3/2003 | Tang ........................... | 717/168 |
| 2003/0126427 | A1 | * | 7/2003 | Kim et al. ...................... | 713/2 |
| 2005/0007912 | A1 | * | 1/2005 | Kawamae et al. ......... | 369/47.21 |
| 2005/0081024 | A1 | * | 4/2005 | Khatri et al. ................. | 713/100 |
| 2005/0160257 | A1 | * | 7/2005 | Kruger et al. .................. | 713/2 |
| 2005/0229173 | A1 | * | 10/2005 | Mihm et al. ................. | 717/171 |
| 2006/0206703 | A1 | * | 9/2006 | Kim et al. ....................... | 713/2 |
| 2007/0288692 | A1 | * | 12/2007 | Bruce et al. .................. | 711/113 |
| 2008/0005462 | A1 | * | 1/2008 | Pyeon et al. ................. | 711/113 |
| 2009/0204822 | A1 | * | 8/2009 | Freeman et al. ............. | 713/189 |

FOREIGN PATENT DOCUMENTS

| JP | 07-044325 | 2/1995 |
|---|---|---|
| JP | 08-137622 | 5/1996 |
| JP | 10-254770 | 9/1998 |
| JP | 2003-216435 | 7/2003 |
| JP | 2004-030184 | 1/2004 |
| KR | 2005-0012992 | 2/2005 |

* cited by examiner

*Primary Examiner*—Abdelmoniem Elamin
(74) *Attorney, Agent, or Firm*—Greer, Burns & Crain, Ltd.

(57) ABSTRACT

A disk apparatus has a memory storing boot-information; and a stop section which reads, upon receipt of a stop event, the boot-information from a disk and checks the read information against the boot-information in the memory. This section updates contents of the memory to store therein the same boot-information as that in the disk and writes flag-information indicating that the same boot-information is stored in the memory when a difference is found by the checking. The apparatus also has a start section which judges, upon receipt of a start event, whether or not the flag-information is stored in the memory, reads the boot-information from the memory and activates a device used with the apparatus while deleting the flag-information when the flag-information is stored. This section reads the boot-information from the disk to activate the device and writes the read boot-information in the memory when the flag-information is not stored.

8 Claims, 11 Drawing Sheets

DISK APPARATUS AND ELECTRONIC APPARATUS

BACKGROUND OF THE INVENTION

1. Field of the Invention

The present invention relates to an electronic apparatus including a disk apparatus which makes access to a disk such as a hard disk and a magneto optical disk by rotating the disk while freely stopping the disk and a disk apparatus which makes access to a disk in which information is written and read by rotating the disk while freely stopping the disk.

2. Description of the Related Art

Recently, portable devices such as a so-called notebook type personal computer (notebook PC) into which a hard disk apparatus is incorporated become widespread. The hard disk apparatus makes access to the disc-shape hard disk in which the information is written and read during the rotation of the disk by rotating the hard disk while freely stopping the hard disk.

FIG. 11 is a block diagram showing a conventional hard disk apparatus incorporated into the notebook PC.

A hard disk apparatus 100 of FIG. 11 includes plural disc-shape hard disks 101 in which the information is written and read during rotation of the hard disk. The hard disk apparatus 100 includes plural heads which make access to the disc-shape hard disk 101 while coming close to the surfaces of the hard disks 101. The hard disk apparatus 100 includes a head circuit 102 having plural preamplifier units corresponding to the plural heads. In the head circuit 102, the preamplifier unit amplifies a signal indicating the information from the hard disk 101 which is read by the head arranged corresponding to the hard disk 101, and a signal for writing the information in the hard disk 101 is supplied to the head while the preamplifier unit is used as a buffer.

The hard disk apparatus 100 also includes a head selection circuit 103, a recording and reproducing circuit 104, a serial-parallel conversion circuit 105, a disk control circuit 106, an interface control circuit 107, and a buffer memory 108.

The head selection circuit 103 outputs the signal from the selected head to the recording and reproducing circuit 104, and the head selection circuit 103 outputs the signal from the recording and reproducing circuit 104 to the selected head.

The recording and reproducing circuit 104 outputs a reproducing serial signal from the head selection circuit 103 to the serial-parallel conversion circuit 105, and also outputs a recording serial signal for recording to the hard disk 101 transmitted from the serial-parallel conversion circuit 105 to the head selection circuit 103.

The serial-parallel conversion circuit 105 converts a parallel signal from the disk control circuit 106 into the serial signal to output the converted signal to the recording and reproducing circuit 104, and the serial-parallel conversion circuit 105 converts the serial signal from the recording and reproducing circuit 104 into the parallel signal.

The disk control circuit 106 inputs the parallel signal from the serial-parallel conversion circuit 105, constructs the inputted parallel signal in a sector unit including the predetermined number of bytes to perform error correction and the like, and outputs the signal through the interface control circuit 107 to a CPU 200 included in the notebook PC into which the hard disk apparatus 100 is incorporated. The disk control circuit 106 performs a coding process to the parallel signal inputted from the CPU 200 through the interface control circuit 107, and outputs the signal to the serial-parallel conversion circuit 105.

The interface control circuit 107 controls the disk control circuit 106 and the buffer memory 108 based on a command from the CPU 200, and transfers the parallel signal from the disk control circuit 106 or the buffer memory 108 to the CPU 200.

The buffer memory 108 is a volatile memory in which contents are deleted when the power is turned off. The parallel signal inputted from the CPU 200 through the interface control circuit 107 is tentatively stored in the buffer memory 108, and also the parallel signal inputted from the serial-parallel conversion circuit 105 through the disk control circuit 106 is tentatively stored in the buffer memory 108.

In the portable device into which the hard disk apparatus is incorporated, there is a demand for shortening a start-up time necessary to become a user working environment in which the user can work after the power is turned on. For this end, it is necessary to rapidly start up an operating system (hereinafter abbreviated to OS) which controls the portable device. OS is stored in the hard disk apparatus and thus, it is important to shorten the start-up time of the hard disk apparatus to rapidly start up the portable device. However, in the hard disk apparatus, a predetermined time is required until the hard disk is stably rotated after the power is turned on. There is a problem that the information stored in the hard disk can be read or the information can be written into the disk only after the predetermined time elapses.

Japanese Patent Application Laid-Open No. 2003-216435 discloses a technique wherein, in a computer system including a hard disk apparatus and a main memory, OS boot information is stored in a nonvolatile memory provided in the hard disk apparatus, the boot information is read from the nonvolatile memory and transferred to a main memory before a motor of the hard disk apparatus reaches a steady speed, and thereby the start-up time is shortened in the hard disk apparatus after the power is turned on.

Japanese Patent Application Laid-Open No. 10-254770 discloses a technique wherein, in an information processing device including a hard disk apparatus, a nonvolatile memory, a cache memory and a signal processing unit, pieces of information on a storage position, an amount of data, data reading order of an OS read from the hard disk apparatus are stored in the nonvolatile memory, the OS is read from the hard disk apparatus and stored in the cache memory based on the pieces of information stored in the nonvolatile memory when the power is turned on to confirm the normal operation of the hard disk apparatus, and the signal processing unit performs the process with OS stored in the cache memory when a read command is issued from the signal processing unit at the time an initializing operation is finished in the whole of the information processing device. According to the technique disclosed in Japanese Patent Application Laid-Open No. 10-254770, OS is read from the cache memory to perform the process at the time the initializing operation is finished, so that the start-up time can be shortened in the information processing device compared with the case where OS is read from the hard disk apparatus at the time the initializing operation is finished.

Japanese Patent Application Laid-Open No. 8-137622 discloses a technique wherein a nonvolatile memory in which a particular address range of an address space of a hard disk apparatus is allocated is provided in the hard disk apparatus, the access is made to the nonvolatile memory when a disk address indicated by a disk access command from a host apparatus is located within the particular address range, and thereby the speed-up in reading the data is achieved in the particular address range.

Japanese Patent Application Laid-Open No. 7-44325 discloses a technique wherein a nonvolatile memory is provided in a hard disk apparatus, information necessary to load an OS in the hard disk apparatus is stored in the nonvolatile memory, and the information is read from the nonvolatile memory to shorten the start-up time of the hard disk apparatus when the hard disk apparatus is started up.

Japanese Patent Application Laid-Open No. 2004-30184 discloses a technique wherein, in booting a personal computer with an OS, the OS previously stored in the hard disk apparatus is re-constructed into a data array that can be read at high speed and stored in the hard disk apparatus, and the boot process is performed at high speed with the OS in which the data array is reconstructed, when the personal computer is booted.

Because a portable device into which a hard disk apparatus is incorporated is frequently driven by a battery, low power consumption is a large problem in the hard disk apparatus. In order to lengthen a battery life as long as possible, frequently the power is turned off during nonuse of the portable device while the power is turned on in use. Therefore, start-up time shortening is also the important problem in the hard disk apparatus. Sometimes OS stored in the hard disk apparatus is updated (version-up) while the power is turned on. However, in the techniques disclosed in Japanese Patent Application Laid-Open No. 2003-216435, Japanese Patent Application Laid-Open No. 8-137622, and Japanese Patent Application Laid-Open No. 7-44325, there is no description concerning the process performed in the nonvolatile memory when the power is turned on again after the power is turned off. Accordingly, even if the OS is updated while the power is turned on, there is a risk of booting the device with pre-update OS when the power is turned on again after the power is turned off.

In the technique disclosed in Japanese Patent Application Laid-Open No. 10-254770, after the power is turned on, it is necessary to wait to read the OS from the hard disk apparatus until the hard disk is stably rotated at the predetermined number of revolutions. In the technique disclosed in Japanese Patent Application Laid-Open No. 2004-30184, after the power is turned on, it is necessary to wait to read the data of the OS in which the data array is reconstructed from the hard disk apparatus until the hard disk is stably rotated at the predetermined number of revolutions. Accordingly, it is difficult to shorten the start-up time of the hard disk apparatus.

The hard disk apparatus includes a motor which stably rotates the hard disk at the predetermined number of revolutions while the information stored in the hard disk is read or the information is written in the hard disk. The motor requires relatively large power consumption, which makes the hard disk apparatus require large power consumption as well.

Conventionally, information to be written in the hard disk which is transmitted from the outside is tentatively stored in a buffer memory included in the hard disk apparatus, the motor is driven to rotate the hard disk at the time the write information reaches a predetermined capacity so as to transfer the information to be written in the hard disk to the hard disk. Therefore, low power consumption can be achieved in the hard disk apparatus as compared with the case where the write information is written in the hard disk by driving the motor in each time the write information is transmitted from the outside.

Although the conventional buffer memory is a volatile memory in which contents is deleted when the power is turned off, the power is turned off after the information stored in the buffer memory is transferred to the hard disk, when a command for turning off the power is received. However, sometimes there is a case where the power is turned off because a power cord is mistakenly removed or battery voltage is decreased. In this case, the electric power necessary for the power turn-off process cannot be supplied to the hard disk apparatus, so that the information cannot be transferred to the hard disk or the transfer is interrupted. In such cases, the power is turned on again, the hard disk information is read to confirm contents after the hard disk is stably rotated at the predetermined number of revolutions, and the necessary information is written in the buffer memory from the outside again. Accordingly, it is difficult to achieve start-up time shortening and low power consumption.

In other conventional disk apparatus such as a magneto optical disk apparatus including a magneto optical disk, there is also a problem that start-up time shortening and low power consumption is hardly achieved.

SUMMARY OF THE INVENTION

The present invention has been made in view of the above circumstances and provides a disk apparatus in which start-up time shortening and low power consumption are achieved, and an electronic apparatus including the disk apparatus.

A first disk apparatus according to the invention is a disk apparatus which is incorporated into or connected to a device to make access to a disk during rotation of the disk by rotating the disk while freely stopping the disk, information including boot information necessary to start up the device being written and read in the disk, the disk apparatus including:

a nonvolatile memory in which the boot information is stored;

an operation stop processing section which reads, upon receipt of a predetermined operation stop event, the boot information stored in the disk from the disk, the operation stop processing section checking the read boot information against the boot information stored in the nonvolatile memory, the operation stop processing section updating contents of the nonvolatile memory in order to store the same boot information as the boot information stored in the disk in the nonvolatile memory and writing flag information indicating that the same boot information as the boot information stored in the disk is stored in the nonvolatile memory when a difference exists as a result of the checking; and an operation start processing section which judges, upon receipt of a predetermined operation start event, whether or not the flag information is stored in the nonvolatile memory, the operation start processing section reading the boot information from the nonvolatile memory and starting up the device while deleting the flag information when the flag information is stored, the operation start processing section reading the boot information from the disk to start up the device and writing the boot information read from the disk in the nonvolatile memory when the flag information is not stored.

In the first disk apparatus according to the invention, when the power is turned off, the boot information stored in the disk is read and checked against the boot information stored in the nonvolatile memory, and the contents of the nonvolatile memory are updated such that the same boot information as the boot information stored in the disk is stored in the nonvolatile memory, when a difference exists. The flag information indicating that the same boot information as the boot information in the disk is stored is written in the nonvolatile memory. Therefore, even if the boot information in the disk apparatus is updated in mid-course, the post-update boot information and the flag information indicating that the post-update boot information is stored are stored in the nonvolatile memory before the power is turned off. When the flag information is stored in turning on the power, the boot information is read from the nonvolatile memory to start up the device. Therefore, the device can be rapidly started up with the post-update boot information. Accordingly, the device is never started up with the pre-update boot information, and it is not necessary to wait until the disk reaches a predetermined number of revolutions, so that low power consumption can be achieved while the device is started securely and rapidly with the latest boot information.

In the first disk apparatus according to the invention, preferably, the operation start processing section writes the boot information along with information indicating an address where the boot information is read on the disk when the boot information read from the disk is written in the nonvolatile memory, and the operation stop processing section refers to, upon receipt of an operation stop event, the nonvolatile memory to obtain the information indicating the address where the boot information is stored in the disk, the operation stop processing section reading the boot information stored in the disk from the address of the disk.

In this way, the address of the boot information is written in the nonvolatile memory, the operation stop event is received to obtain address information by referring to the nonvolatile memory, and the boot information in the disk is read from the address and checked against the boot information stored in the nonvolatile memory. When a difference is found in the check, the boot information stored in the boot information can be updated into the boot information read from the address.

In the first disk apparatus according to the invention, preferably, when an address where the boot information is stored in the disk is changed, the operation stop processing section stops working for rewriting the boot information stored in the nonvolatile memory into the same boot information as the boot information stored in the disk, and deletes the flag information or maintains the flag information in the deleted state.

When the address where the boot information in the disk is stored is changed, the flag information is deleted or the flag information is maintained in the deleted state, the process of reading the boot information in the disk to start up the device and of writing the boot information read from the disk in the nonvolatile memory is performed after the disk has reached a stable state of a predetermined number of revolutions since the power is turned on. Even if the address of the boot information is changed, the same boot information as the boot information stored in the disk cannot be written in the nonvolatile memory because the electric power necessary for the power turn-off process cannot be supplied to the disk apparatus. Accordingly, the device can be normally started up like the case where the flag information is not written in the nonvolatile memory. When the power is turned on again, the device can be rapidly started up with the boot information stored in the nonvolatile memory.

In the first disk apparatus according to the invention, preferably the boot information is comprised of master boot record information, boot sector information, and kernel information.

The master boot record information, the boot sector information, and the kernel information are of the most basic information in the functions necessary to start up the device. The master boot record information, the boot sector information, and the kernel information are stored in the nonvolatile memory, so that the device can be rapidly started up.

A second disk apparatus according to the invention is a disk apparatus which is incorporated into or connected to a device to make access to a disk during rotation of the disk by rotating the disk while freely stopping the disk, information including boot information necessary to start up the device being written and read in the disk, the disk apparatus including:

a nonvolatile memory;

a write processing section which tentatively stores information to be written in the disk in the nonvolatile memory, and transfers the information in the nonvolatile memory to the disk to delete the information stored in the nonvolatile memory in each time the information reaches a predetermined capacity in the nonvolatile memory;

an operation stop processing section which judges, upon receipt of a predetermined operation stop event, whether or not the information to be written in the disk is stored in the nonvolatile memory, the operation stop processing section transferring the information to the disk when the information is stored in the nonvolatile memory; and an operation start processing section which judges, upon receipt of a predetermined operation start event, whether or not the information to be written in the disk is stored in the nonvolatile memory, the operation start processing section transferring the information to the disk when the information is stored in the nonvolatile memory.

In the second disk apparatus according to the invention, when the write information is stored in the nonvolatile memory in turning off the power, the write information is transferred to the disk. When the write information is stored in the nonvolatile memory in turning on the power, the write information is transferred to the disk. Therefore, even when the power is turned off because a power cord is mistakenly removed or a battery voltage is decreased and thus, the electric power necessary for a power turn-off process cannot be supplied to the disk apparatus and the information cannot be transferred to the hard disk 101 or the transfer is interrupted, the write information stored in the nonvolatile memory can be transferred to the disk after the disk has reached a stable state of a predetermined number of revolutions since the power is turned on. In a conventional process performed in a disk apparatus including a volatile memory in which write information is stored, when the power is turned on again, the information on the disk is read to confirm the contents after the disk is stably rotated at the predetermined number of revolutions, and the necessary information is written in a buffer memory from the outside. Accordingly, the conventional process is not required in the disk apparatus, so that start-up time shortening and low power consumption can be achieved.

A first electronic apparatus according to the invention is an electronic apparatus including a disk apparatus which makes access to a disk by rotating the disk while freely stopping the disk, information being written and read in the disk, the electronic apparatus being started up by boot information read from the disk apparatus in which the boot information necessary to start up the disk apparatus is stored, wherein the disk apparatus includes:

a nonvolatile memory in which the boot information is stored;

an operation stop processing section which reads, upon receipt of a predetermined operation stop event, the boot information stored in the disk from the disk, the operation stop processing section checking the read boot information against the boot information stored in the nonvolatile memory, the operation stop processing section updating contents of the nonvolatile memory in order to store the same boot information as the boot information stored in the disk in the nonvolatile memory and writing flag information indicating that the same boot information as the boot information stored in the disk is stored in the nonvolatile memory when a difference exists as a result of the checking; and an operation start processing section which judges, upon receipt of a predetermined operation start event, whether or not the flag information is stored in the nonvolatile memory, the operation start processing section reading the boot information from the nonvolatile memory and starting up the device while deleting the flag information when the flag information is stored, the operation start processing section reading the boot information from the disk to start up the device and writing the boot information read from the disk in the nonvolatile memory when the flag information is not stored.

The first electronic apparatus according to the invention includes the first disk apparatus according to the invention. Therefore, the device is never started up with the pre-update boot information, and it is not necessary to wait until the disk reaches the predetermined number of revolutions, so that low power consumption can be achieved while the device is started securely and rapidly with the latest boot information.

In the first electronic apparatus according to the invention, preferably, the operation start processing section writes the boot information along with information indicating an address where the boot information is read on the disk when the boot information read from the disk is written in the nonvolatile memory, and the operation stop processing section refers to, upon receipt of the operation stop event, the nonvolatile memory to obtain the information indicating the address where the boot information is stored in the disk, the operation stop processing section reading the boot information stored in the disk from the address of the disk.

Further, in the first electronic apparatus according to the invention, preferably, when an address where the boot information is stored in the disk is changed, the operation stop processing section stops working for rewriting the boot information stored in the nonvolatile memory into the same boot information as the boot information in the disk, and deletes the flag information or maintains the flag information in the deleted state.

Furthermore, in the first electronic apparatus according to the invention, preferably, the boot information is comprised of master boot record information, boot sector information, and kernel information.

A second electronic apparatus according to the invention is an electronic apparatus including a disk apparatus which makes access to a disk by rotating the disk while freely stopping the disk, information being written and read in the disk, the electronic apparatus being started up by boot information read from the disk apparatus in which the boot information necessary to start up the disk apparatus is stored, wherein the disk apparatus includes:

a nonvolatile memory;

a write processing section which tentatively stores information to be written in the disk in the nonvolatile memory, the write processing section transferring the information stored in the nonvolatile memory to the disk to delete the information stored in the nonvolatile memory in each time the information reaches a predetermined capacity in the nonvolatile memory;

an operation stop processing section which judges, upon receipt of a predetermined operation stop event, whether or not the information to be written in the disk is stored in the nonvolatile memory, the operation stop processing section transferring the information to the disk when the information is stored in the nonvolatile memory; and an operation start processing section which judges, upon receipt of a predetermined operation start event, whether or not the information to be written in the disk is stored in the nonvolatile memory, the operation start processing section transferring the information to the disk when the information is stored in the nonvolatile memory.

The second electronic apparatus according to the invention includes the second disk apparatus according to the invention. In a conventional process performed in a disk apparatus including a volatile memory in which write information is stored, when the power is turned on again, the information on the disk is read to confirm the contents after the disk is stably rotated at the predetermined number of revolutions, and the necessary information is written in a buffer memory from the outside. Accordingly, in the second electronic apparatus according to the invention, the conventional process is not required, so that start-up time shortening and low power consumption can be achieved.

Thus, the present invention can provide the disk apparatus and the electronic apparatus including the disk apparatus in which start-up time shortening and low power consumption are achieved.

DETAILED DESCRIPTION OF THE INVENTION

Embodiments of the invention will be described with reference to the drawings.

Figure 1:
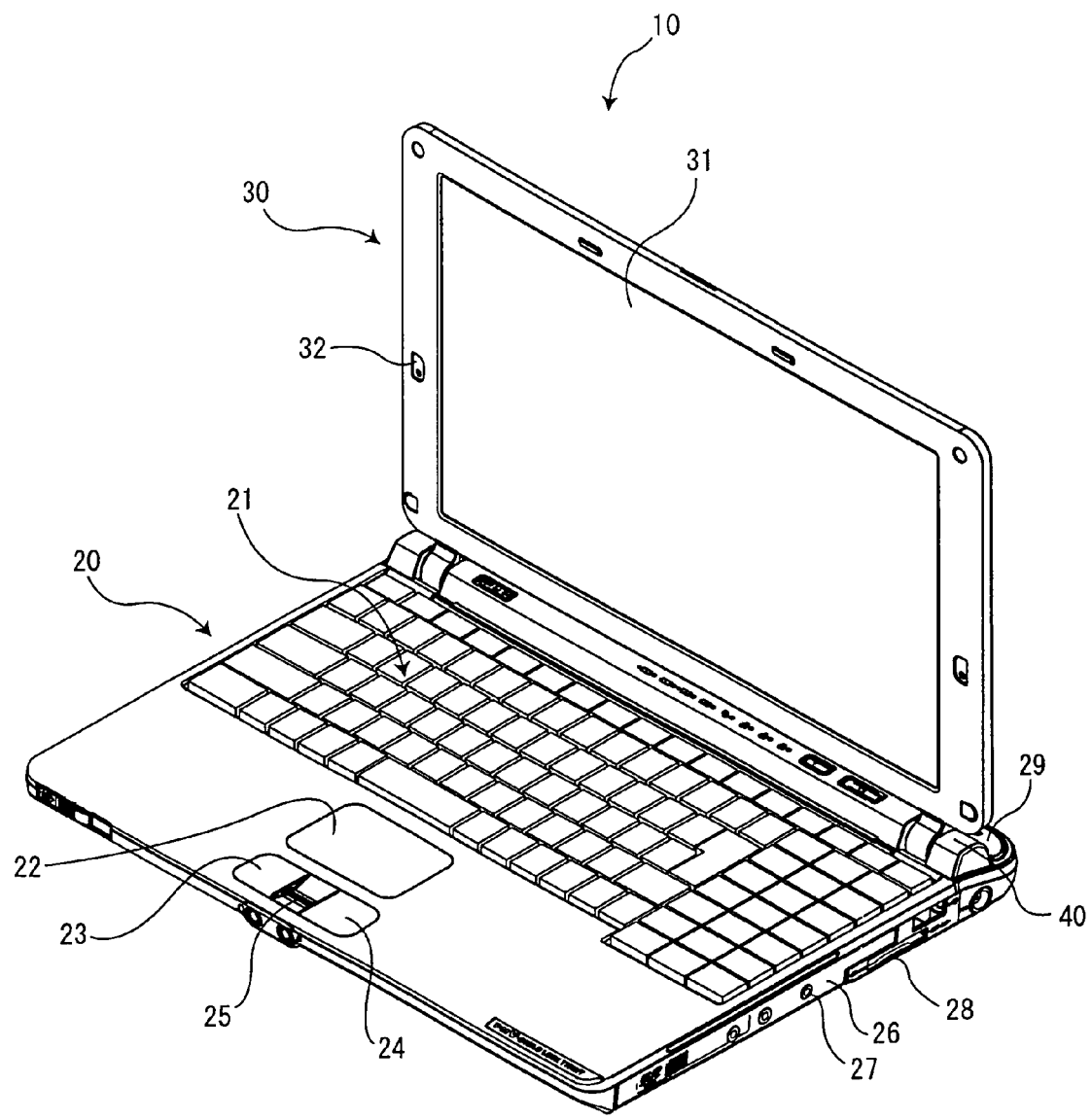
FIG. 1 is a perspective view schematically showing a notebook PC into which embodiments of both a hard disk apparatus according to a first aspect of the invention and a hard disk apparatus according to a second aspect of the invention are incorporated.

FIG. 1 is a perspective view schematically showing a notebook PC into which embodiments of both the hard disk apparatus according to the first aspect of the invention and the hard disk apparatus according to the second aspect of the invention are incorporated.

As described in detail later, a hard disk apparatus which is of the embodiments of both the hard disk apparatus according to the first aspect of the invention and the hard disk apparatus according to the second aspect of the invention are incorporated in a notebook PC 10 of FIG. 1. The hard disk apparatus makes access to a disc-shape hard disk (corresponding to an example of the disk of the invention), in which information including boot information necessary to boot the notebook PC 10 is written and read during the rotation of the hard disk, by rotating the hard disk while freely stopping the hard disk. The notebook PC 10 corresponds to examples of the first and second electronic apparatus according to the invention.

The notebook PC 10 includes two housings: a main body unit 20 and a display unit 30. The display unit 30 includes a display screen 31 which displays an image, and the display unit 30 is openably supported by a hinge portion 40.

A keyboard 21 is provided in an upper surface of the main body unit 20. The main body unit 20 includes a glide point 22, a left click button 23 and a right click button 24, and a fingerprint sensor 25. The glide point 22 detects finger contact and motion of a contact finger. The left click button 23 and the right click button 24 act as a left button and a right button of a mouse respectively. The fingerprint sensor 25 which detects a fingerprint is arranged between left click button 23 and the right click button 24.

A main circuit board on which circuits such as CPU for performing various processes are mounted is incorporated into the housing of the main body unit 20. An end face 26 of a CD/DVD drive is exposed in a right side face of the main body unit 20. CD or DVD is loaded in the CD/DVD drive while freely taken out, and the CD/DVD drive makes access to CD or DVD during the rotation by rotating CD or DVD loaded in the CD/DVD drive. An eject button 27 is provided in the end face 26, and a CD/DVD drive tray slides to the outside of the main body unit by pressing the eject button 27.

In the right side face of the main body unit 20, a media slot insertion port 28 is also provided at a position where a part of the media slot insertion port 28 vertically overlaps the CD/DVD drive. Various storage mediums such as SmartMedia® and xD card® are inserted into the media slot insertion port 28 while freely taken out, and the access to the storage medium is performed through the media slot.

The display unit 30 includes the display screen 31, and a hole 32 is made in a front face cover surrounding the display screen 31. The hole 32 introduces sound to a microphone (not shown) arranged inside.

The hinge portion 40 has a structure in which the display unit 30 is openably supported by the main body unit 20.

A speaker 29 is provided at the back of the hinge portion 40 in the main body unit 20.

Figure 2:
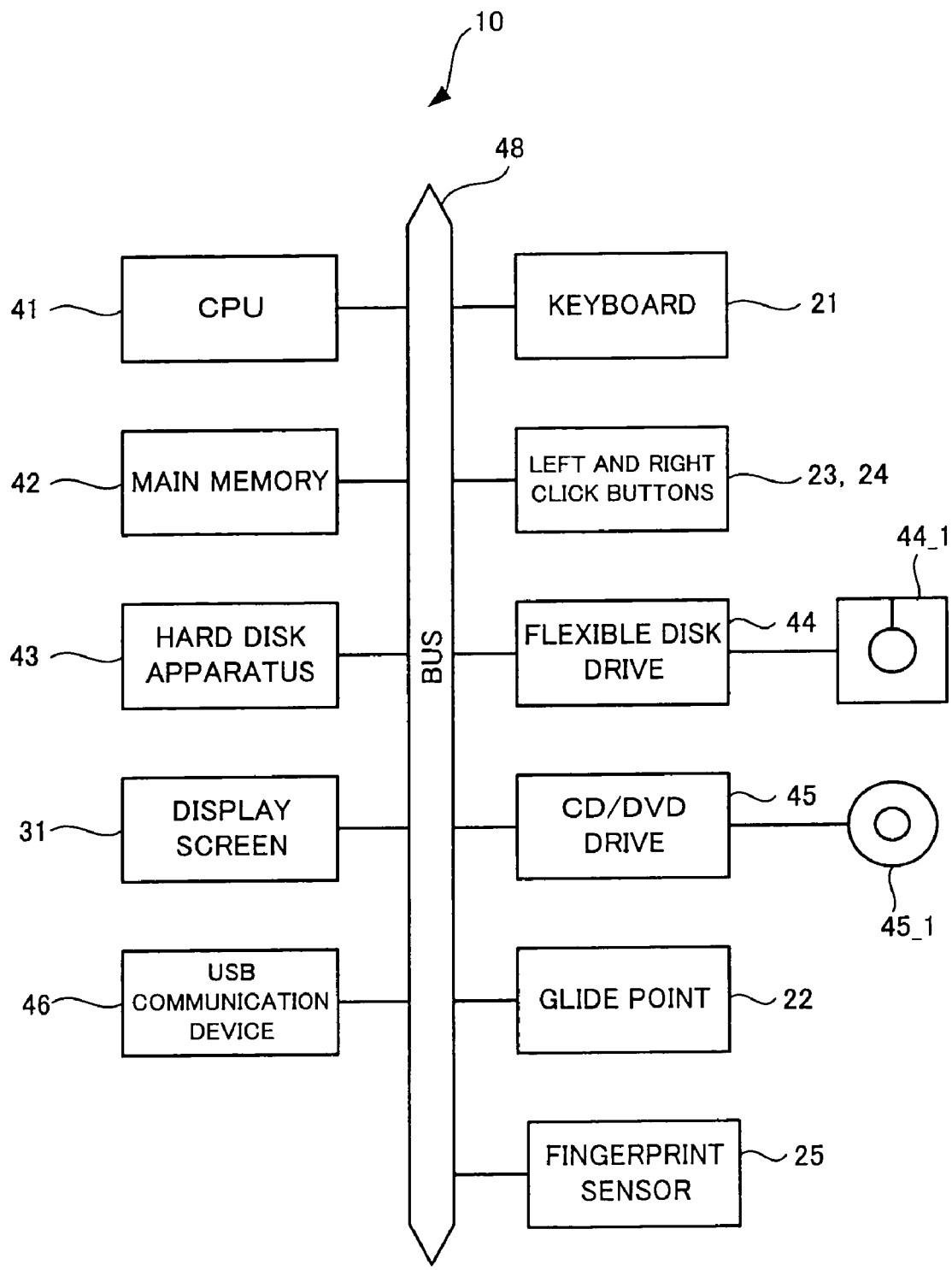
FIG. 2 is a block diagram showing a schematic circuit of the notebook PC of FIG. 1.

FIG. 2 is a block diagram showing a schematic circuit of the notebook PC of FIG. 1.

The notebook PC 10 of FIG. 2 includes a CPU 41, a main memory 42, a hard disk apparatus 43, a flexible disk drive 44, a CD/DVD drive 45, and a USB communication device 46. As shown in FIG. 1, the notebook PC 10 also includes the display screen 31, the keyboard 21, the left and right click buttons 23 and 24, the glide point 22, and the fingerprint sensor 25. The CPU 41 executes various programs. In the main memory 42, the program stored in the hard disk apparatus 43 which is of the first disk apparatus and the second disk apparatus according to the embodiment of the invention is read and expanded to execute the program using CPU 41. The various program and image data are stored in the hard disk apparatus 43. A flexible disk 44_1 is loaded in the flexible disk drive 44, and the flexible disk drive 44 makes access to the loaded flexible disk 44_1. The CD/DVD drive 45 makes access to a CD/DVD 45_1. The USB communication device 46 is connected to a USB communication device included in a digital camera or the like, and the USB communication device 46 captures image data from the USB communication device. These components are mutually connected through a bus 48.

Figure 3:
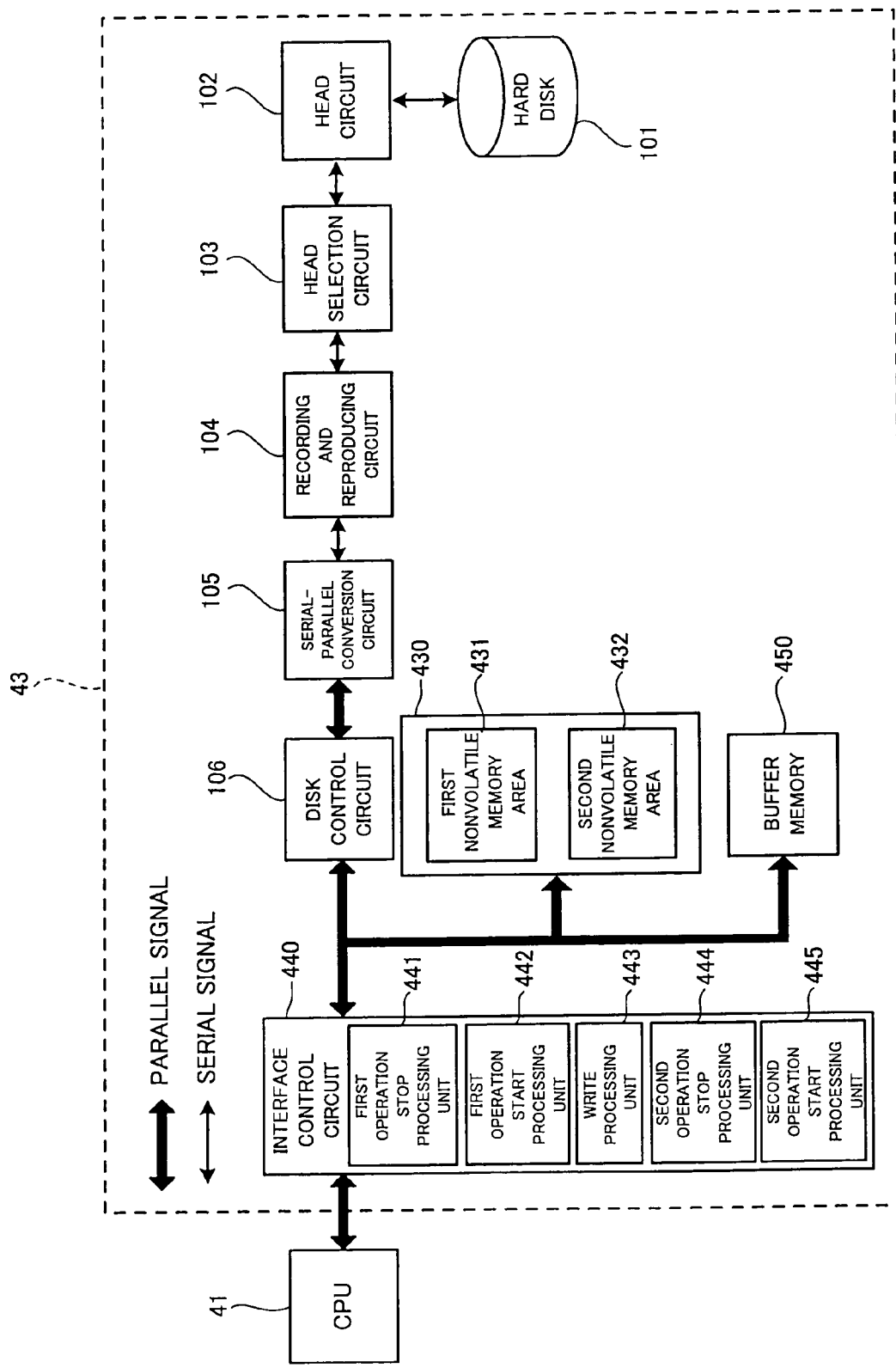
FIG. 3 is a block diagram showing the hard disk apparatus of FIG. 2.

FIG. 3 is a block diagram showing the hard disk apparatus 43 of FIG. 2.

Figure 11:
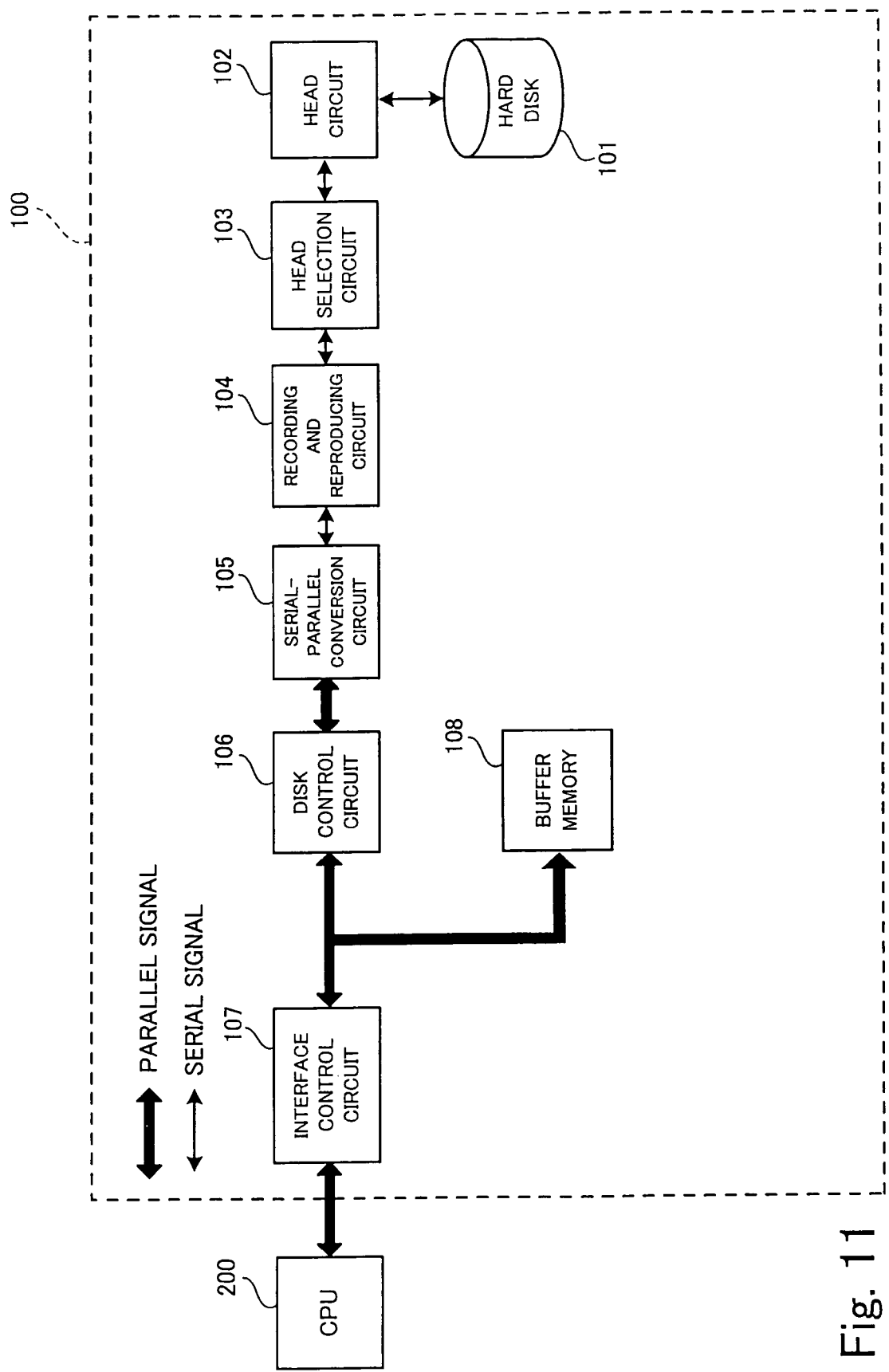
FIG. 11 is a block diagram showing a conventional hard disk apparatus incorporated into the notebook PC.

The same components as those of the hard disk apparatus 100 of FIG. 11 are designated by the same numerals, and only the different point will be described.

The hard disk apparatus 43 of FIG. 3 includes a nonvolatile memory 430 having both a first nonvolatile memory area 431 and a second nonvolatile memory area 432 and a buffer memory 450.

The first nonvolatile memory area 431 acts as the nonvolatile memory in the first disk apparatus of the invention, and the later-mentioned boot information is tentatively stored in the first nonvolatile memory area 431.

The second nonvolatile memory area 432 acts as the nonvolatile memory in the second disk apparatus of the invention, and the information written in the hard disk apparatus 43 is tentatively stored in the second nonvolatile memory area 432.

The information from the hard disk 101 is tentatively stored in the buffer memory 450.

The hard disk apparatus 43 of FIG. 3 includes an interface control circuit 440, and the interface control circuit 440 includes a first operation stop processing unit 441, a first operation start processing unit 442, a write processing unit 443, a second operation stop processing unit 444 and a second operation start processing unit 445.

The first operation stop processing unit 441 and the first operation start processing unit 442 correspond to examples of the operation stop processing section and the operation start processing section in the first disk apparatus of the invention, respectively. The second operation stop processing unit 444 and the second operation start processing unit 445 correspond to examples of the operation stop processing section and the operation start processing section in the second disk apparatus of the invention, respectively. First the first operation stop processing unit 441 and the first operation start processing unit 442 will be described along with the first nonvolatile memory area 431 which acts as the nonvolatile memory in the first disk apparatus of the invention.

When the power of the notebook PC 10 is turned off, the first operation stop processing unit 441 receives a predetermined operation stop event from the CPU 41 to read boot information stored in the hard disk 101 from the hard disk 101, and the first operation stop processing unit 441 checks the boot information stored in the hard disk 101 against boot information stored in the first nonvolatile memory area 431. When a difference point exists between the two pieces of boot information, the first operation stop processing unit 441 updates contents of the first nonvolatile memory area 431 such that the same boot information as the boot information stored in the hard disk 101 is stored in the first nonvolatile memory area 431. The first operation stop processing unit 441 writes identification information (corresponding to an example of the flag information in the invention) in the first nonvolatile memory area 431. The identification information indicates that the same boot information as the boot information stored in the hard disk 101 is stored in the first nonvolatile memory area 431.

Specifically, when the first operation stop processing unit 441 receives the operation stop event, the first operation stop processing unit 441 refers to the first nonvolatile memory area 431 to obtain information indicating an address where the boot information in the hard disk 101 is stored, and the first operation stop processing unit 441 reads the boot information in the hard disk 101 from the address of the hard disk 101.

When the address where the boot information in the hard disk 101 is stored is changed, the first operation stop processing unit 441 stops working for rewriting the boot information in the first nonvolatile memory area 431 to the same boot information as the boot information in the hard disk 101, and deletes the identification information or maintains the identification information in the deleted state.

On the other hand, when the power of the notebook PC 10 is turned on, the first operation start processing unit 442 receives a predetermined operation start event from the CPU 41 to judge whether or not the identification information is stored in the first nonvolatile memory area 431. When the identification information is stored in the first nonvolatile memory area 431, the first operation start processing unit 442 reads the boot information from the first nonvolatile memory area 431 to boot the notebook PC 10, and deletes the identification information. When the identification information is not stored in the first nonvolatile memory area 431, the first operation start processing unit 442 reads the boot information from the hard disk 101 to boot the notebook PC 10, and writes the boot information read from the hard disk 101 in the first volatile memory area 431.

Specifically, in writing the boot information read from the hard disk 101 in the first nonvolatile memory area 431, the first operation start processing unit 442 writes the boot information along with information indicating the address where the boot information is read on the hard disk 101.

Figure 4:
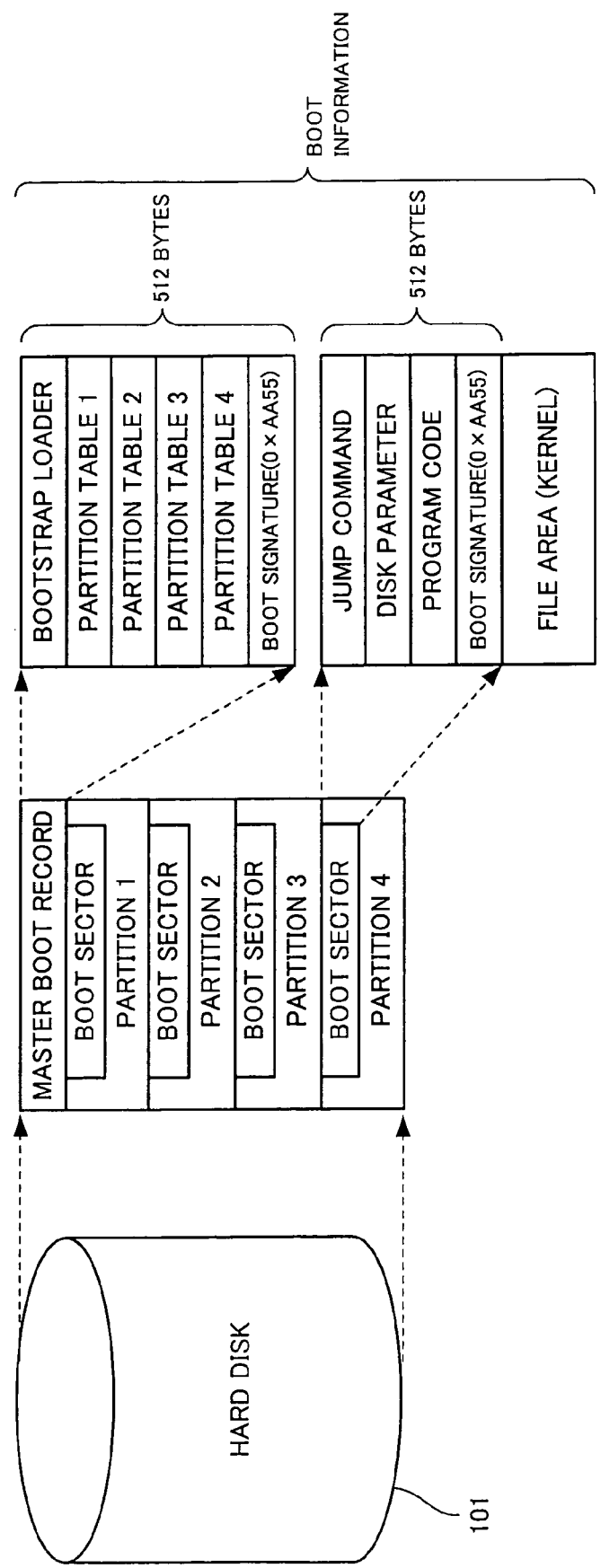
FIG. 4 shows areas of the hard disk of FIG. 3.

FIG. 4 shows areas of the hard disk of FIG. 3.

The hard disk 101 of FIG. 4 includes a master boot record area and partitions areas 1, 2, 3, and 4 which have boot sector areas respectively.

The master boot record area is formed by a 512-byte data area, and the 512-byte data area includes a bootstrap loader area, partition table areas 1, 2, 3, and 4, and a boot signature (0×AA55) area. The bootstrap loader is a program for reading the partition tables 1, 2, 3, and 4. A boot flag for permitting OS start-up is stored in one of the partition tables 1, 2, 3, and 4, and the boot flag is read with the bootstrap loader. The OS is stored in a partition area corresponding to the partition table in which the boot flag is stored, and the OS is started up by reading the boot flag with the bootstrap loader. The boot signature (0×AA55) is information for confirming that OS stored in the partition area having a boot sector area is correct.

The boot sector area is formed by a 512-byte data area, and the 512-byte data area includes a jump command area, a disk parameter area, a program code area, and a boot signature (0×AA55) area. The jump command is a command for jumping to the address of the OS stored in the partition area having the boot sector area. The disk parameter indicates an attribute of the partition. FIG. 4 also shows a file area (kernel) possessed by the partition area. The pieces of information stored in the master boot record area, boot sector area, and file area are the boot information necessary to start up OS.

When the boot signature (0×AA55) stored in the boot sector area possessed by the partition area corresponding to the partition table in which the boot flag is stored is correct, the OS is started up by jumping to the address of the OS stored in the partition area.

Figure 5:
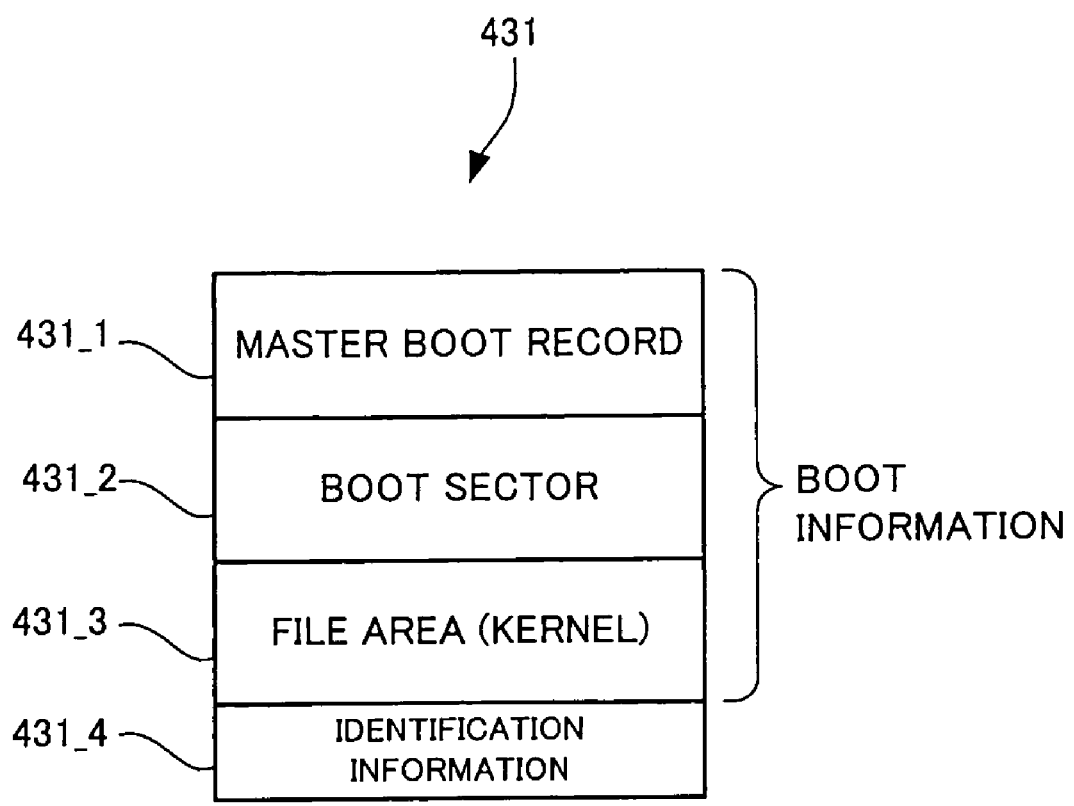
FIG. 5 shows a structure of a first nonvolatile memory area.

FIG. 5 shows a structure of the first nonvolatile memory area 431.

The first nonvolatile memory area 431 includes a master boot record area 431_1, a boot sector area 431_2, and a file area (kernel) 431_3, where master boot record information, boot sector information and file area information, which constitute the boot information are stored, respectively. The first nonvolatile memory area 431 has an identification area 431_4 for writing the identification information.

Figure 6:
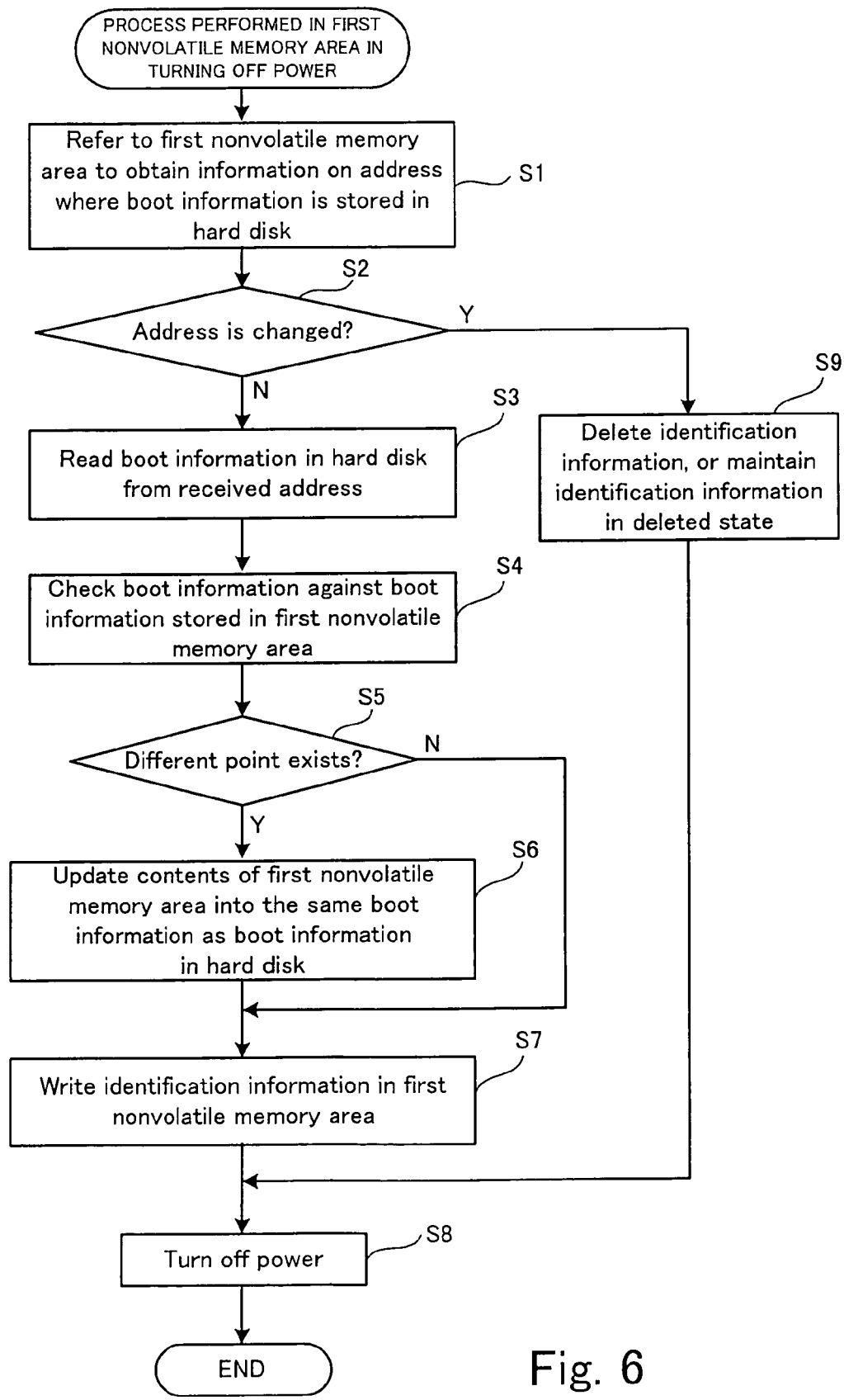
FIG. 6 is a flowchart showing a process performed in the first nonvolatile memory area when the power is turned off in the hard disk apparatus of FIG. 3.

FIG. 6 is a flowchart showing a process performed in the first nonvolatile memory area 431 when the power is turned off in the hard disk apparatus of FIG. 3.

This process is performed, when the power of the notebook PC into which the hard disk apparatus of FIG. 3 is incorporated is turned off.

In step S1, the operation stop processing unit receives a predetermined operation stop event from the CPU, and the operation stop processing unit refers to the first nonvolatile memory area to receive the information indicating the address where the boot information is stored in the hard disk.

In step S2, it is judged whether or not the address in the hard disk is changed. When it is judged that the address in the hard disk is not changed, the flow goes to step S3. In step S3, the boot information in the hard disk is read from the received address. In step S4, the read boot information in the hard disk is checked against the boot information stored in the first nonvolatile memory area.

In step S5, it is judged whether or not the different point exists. When the different point exists, the flow goes to step S6. In step S6, contents of the first nonvolatile memory area is updated into the same boot information as the boot information in the hard disk. Then, the flow goes to step S7. On the other hand, when the different point does not exist, the flow goes directly to step S7.

In step S7, the identification information is written in the first nonvolatile memory area. Then, the flow goes to step S8.

When it is judged in step S2 that the address is changed, the identification information is deleted or the identification information is maintained in the deleted state in step S9. Then, the flow goes to step S8.

In step S8, the power is turned off to end the flow.

Figure 7:
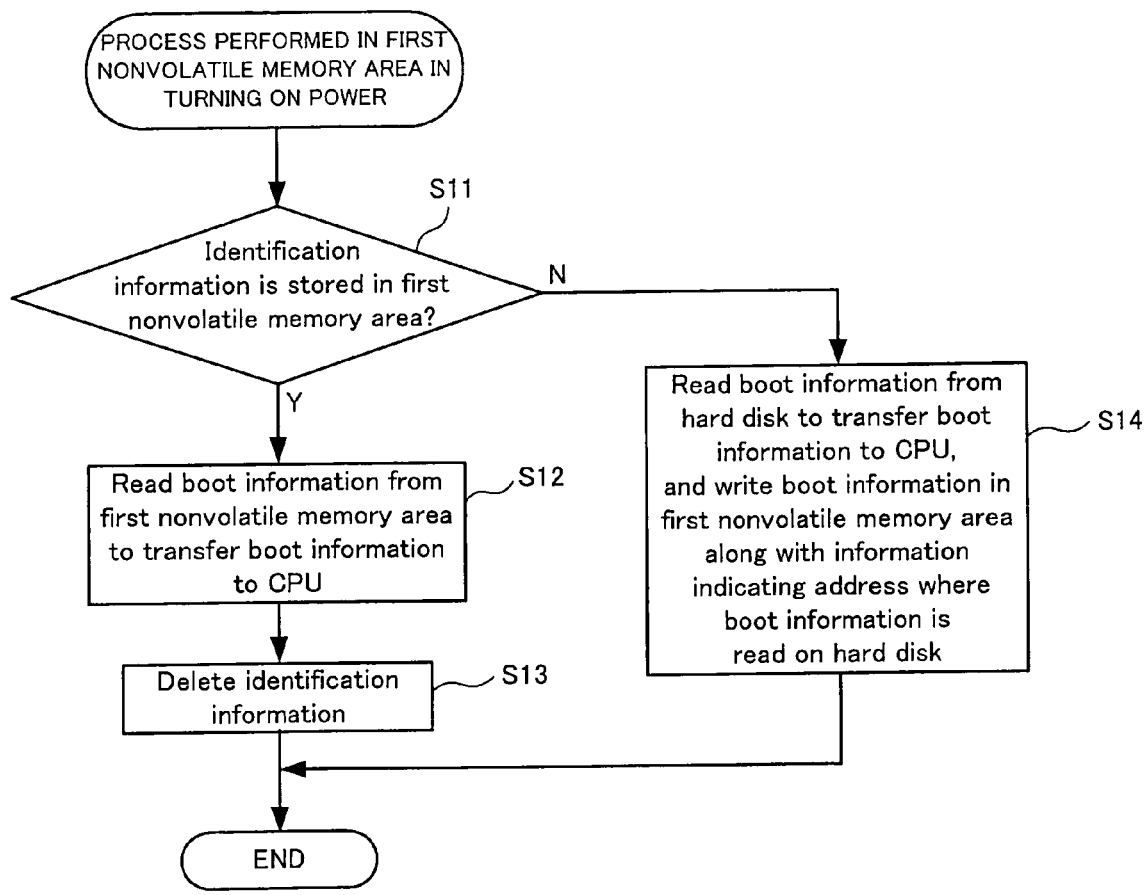
FIG. 7 is a flowchart showing a process performed in the first nonvolatile memory area when the power is turned on in the hard disk apparatus of FIG. 3.

FIG. 7 is a flowchart showing a process performed in the first nonvolatile memory area when the power is turned on in the hard disk apparatus of FIG. 3.

This process is performed, when the power of the notebook PC into which the hard disk apparatus of FIG. 3 is incorporated is turned on.

In step S11, the operation start processing unit receives a predetermined operation start event from the CPU to judge whether or not the identification information is stored in the first nonvolatile memory area. When it is judged that the identification information is stored in the first nonvolatile memory area, the flow goes to step S12. In step S12, the boot information is read from the first nonvolatile memory area and the boot information is transferred to the CPU. In step S13, the identification information is deleted, and the flow is ended.

On the other hand, when it is judged in step S11 that the identification information is not stored in the first nonvolatile memory area, the flow goes to step S14. In step S14, the boot information is read from the hard disk and transferred to the CPU, and the boot information is written in the first nonvolatile memory area along with the information indicating the address where the boot information is read on the hard disk, and the flow is ended.

Thus, in the hard disk apparatus 43 of FIG. 3 which is of the embodiment of the first hard disk apparatus according to the invention, when the power is turned off, the boot information stored in the hard disk 101 is read and checked against the boot information stored in the first nonvolatile memory area 431. When the different point exists, the contents of the first nonvolatile memory area 431 is updated such that the same boot information as the boot information in the hard disk 101 is stored in the first nonvolatile memory area 431. The identification information indicating that the same boot information as the boot information in the hard disk 101 is stored is written in the first nonvolatile memory area 431. Therefore, even if the boot information in the hard disk apparatus 43 is updated at the mid-course, the updated boot information and the identification information indicating that the boot information is updated are stored in the first nonvolatile memory area 431 before the power is turned off. In turning on the power, when the identification information is stored, the boot information is read from the first nonvolatile memory area 431 to boot the notebook PC 10. Therefore, the notebook PC 10 can be rapidly booted with the updated boot information. The notebook PC 10 is never booted with the pre-update boot information, and it is not necessary to wait until the hard disk 101 reaches the predetermined number of revolutions, so that low power consumption can be achieved while the notebook PC 10 is started securely and rapidly with the latest boot information.

In the hard disk apparatus 43, when the boot information read from the hard disk 101 by the first operation start processing unit 442 is written in the first nonvolatile memory area 431, the boot information is written along with information indicating the address where the boot information is read on the hard disk 101. When the power is turned off, the first operation stop processing unit 441 refers to the first nonvolatile memory area 431 to obtain the information indicating the address where the boot information is stored in the hard disk 101, and the first nonvolatile memory area 431 reads the boot information stored in the hard disk 101 from the address of the hard disk 101. Therefore, in the hard disk apparatus 43, the address of the boot information is written in the first nonvolatile memory area 431. When the power is turned off, the address information is obtained by referring to the first nonvolatile memory area 431, and the boot information in the hard disk 101 is read from the address and checked against the boot information stored in the first nonvolatile memory area 431. When a difference is found in the check, the boot information stored in the first nonvolatile memory area 431 can be rewritten into the boot information read from the address.

In the hard disk apparatus 43, when the address where the boot information in the hard disk 101 is stored is changed, the first operation stop processing unit 441 stops the working for rewriting the boot information stored in the first nonvolatile memory area 431 into the same boot information as the boot information in the hard disk 101, and deletes the identification information or maintains the identification information in the deleted state. Therefore, the process of reading the boot information stored in the hard disk 101 to boot the notebook PC 10 and of writing the boot information read from the hard disk 101 in the first nonvolatile memory area 431 is performed after the hard disk 101 has reached a stable state of a predetermined number of revolutions since the power is turned on. Even if the address of the boot information is changed, the same boot information as the boot information stored in the hard disk 101 cannot be written in the first nonvolatile memory area 431 because the electric power necessary for the power turn-off process cannot be supplied to the hard disk apparatus 43. Accordingly, the notebook PC 10 can be normally booted like the case where the identification information is not written in the first nonvolatile memory area 431. When the power is turned on again, the notebook PC 10 can be rapidly booted with the boot information written in the first nonvolatile memory area 431.

The boot information in the hard disk apparatus 43 includes the master boot record information, boot sector information, and kernel information, which are of the most basic information in the functions necessary to boot the notebook PC 10. The master boot record information, boot sector information, and kernel information are stored in the first nonvolatile memory area 431, so that the notebook PC 10 can be rapidly booted.

Then, returning to FIG. 3, the second operation stop processing unit 444 and the second operation start processing unit 445 which are of examples of the operation stop processing section and the operation start processing section in the second hard disk apparatus of the invention, respectively, will be described along with the write processing unit 443 which is of an example of the write processing section in the second hard disk apparatus of the invention and the second nonvolatile memory area 432 which acts as the nonvolatile memory in the second hard disk apparatus of the invention.

The write processing unit 443 of FIG. 3 tentatively stores information to be written in the hard disk 101 in the second nonvolatile memory area 432, and transfers the information stored in the second nonvolatile memory area 432 to the hard disk 101 to delete the information stored in the second nonvolatile memory area 432 when information to be written in the hard disk 101 reaches a predetermined capacity in the second nonvolatile memory area 432.

When the power of the notebook PC 10 is turned off, the second operation stop processing unit 444 receives a predetermined operation stop event from the CPU 41 to judge whether or not information to be written in the hard disk 101 is stored in the second nonvolatile memory area 432. When the information to be written in the hard disk 101 is stored in the second nonvolatile memory area 432, the second operation stop processing unit 444 transfers the information to the hard disk 101.

When the power of the notebook PC 10 is turned on, the second operation start processing unit 445 receives a predetermined operation start event from the CPU 41 to judge whether or not the information to be written in the hard disk 101 is stored in the second nonvolatile memory area 432. When the information to be written in the hard disk 101 is stored in the second nonvolatile memory area 432, the second operation start processing unit 445 transfers the information to the hard disk 101.

Figure 8:
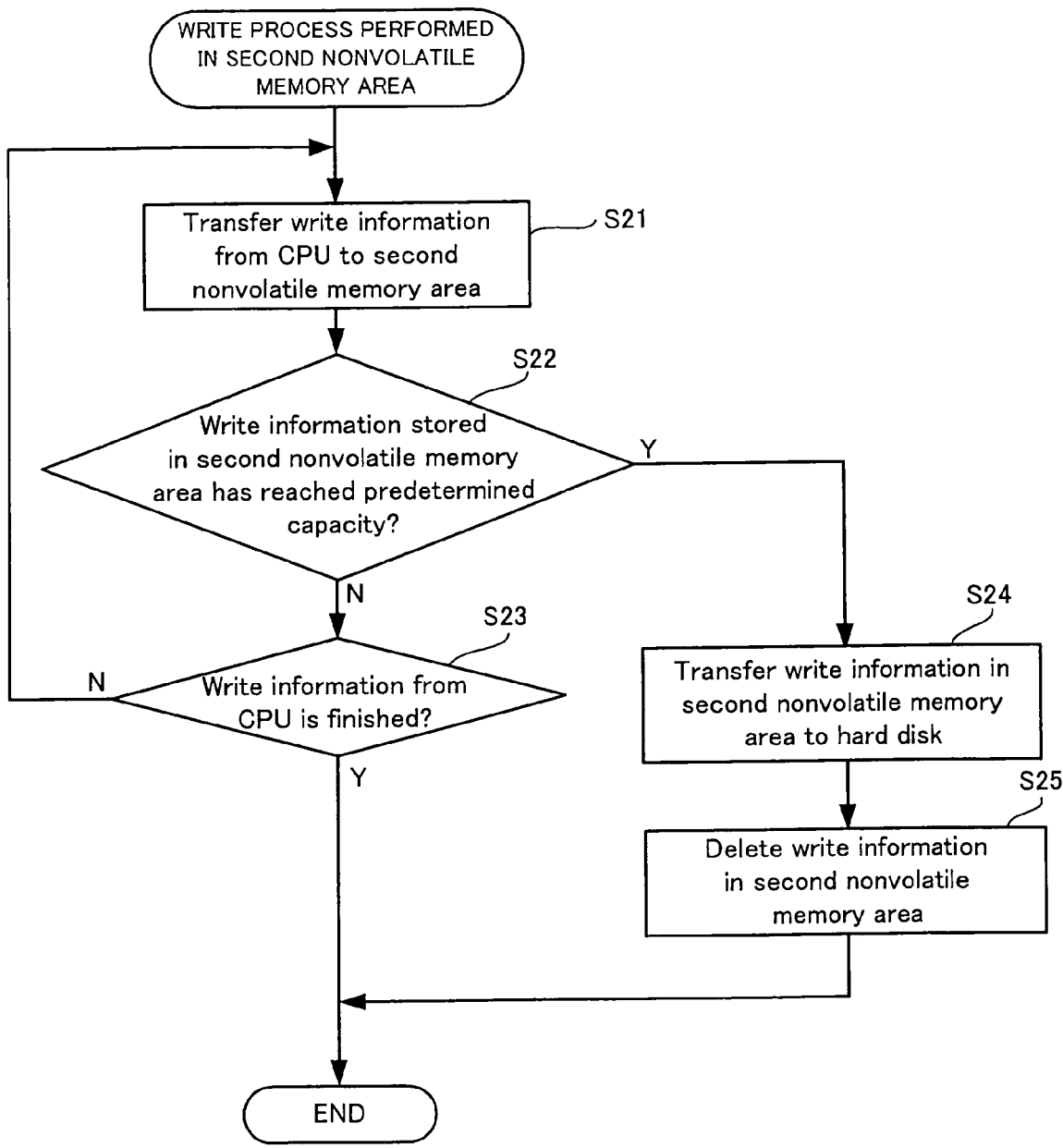
FIG. 8 is a flowchart showing a process of writing information in a second nonvolatile memory area of the hard disk apparatus of FIG. 3.

FIG. 8 is a flowchart showing a process of writing information in a second nonvolatile memory area of the hard disk apparatus of FIG. 3.

The write process is performed after the power of the notebook PC 10 into which the hard disk apparatus 43 of FIG. 3 is incorporated is turned on to start up the OS.

In step S21, the write information is transferred from the CPU to the second nonvolatile memory area.

In step S22, it is judged whether or not the write information stored in the second nonvolatile memory area has reached a predetermined capacity. When it is judged that the write information stored in the second nonvolatile memory area has not reached the predetermined capacity, the flow goes to step S23. In step S23, it is judged whether or not the write information from the CPU is finished. When it is judged that the write information from the CPU is not finished, the flow returns to step S21. On the other hand, when it is judged that the write information from CPU is finished, the flow is ended.

In step S22, when it is judged that the write information reaches the predetermined capacity, the flow goes to step S24. In step S24, the write information in the second nonvolatile memory area is transferred to the hard disk. In step S25, the write information in the second nonvolatile memory area is deleted, and the flow is ended.

Figure 9:
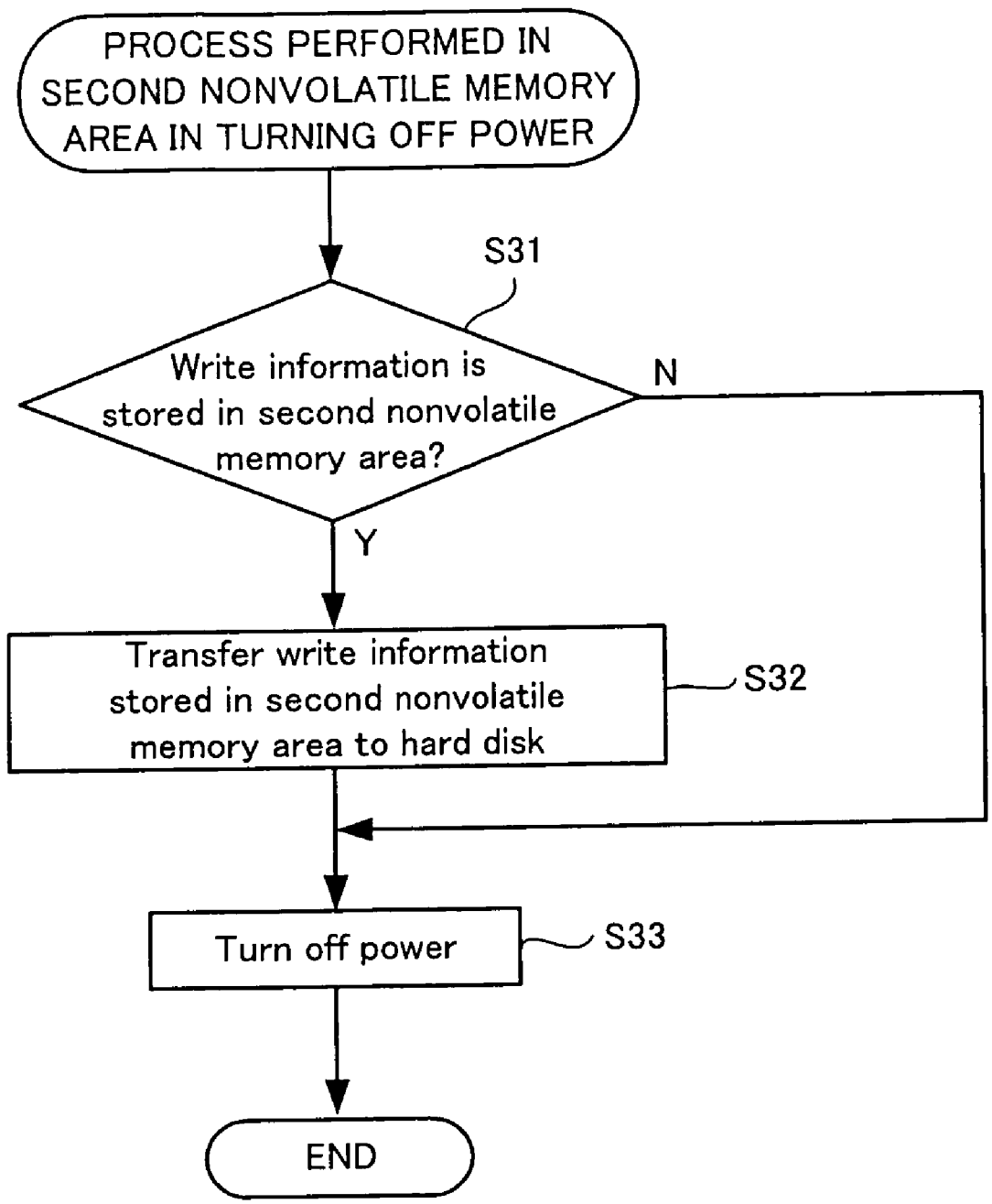
FIG. 9 is a flowchart showing a process performed in the second nonvolatile memory area when the power is turned off in the hard disk apparatus of FIG. 3.

FIG. 9 is a flowchart showing a process performed in the second nonvolatile memory area when the power is turned off in the hard disk apparatus of FIG. 3.

This process is performed, when the power of the notebook PC 10 into which the hard disk apparatus 43 of FIG. 3 is incorporated is turned off.

In step S31, the second operation stop processing unit receives a predetermined operation stop event from the CPU to judge whether or not write information is stored in the second nonvolatile memory area. When it is judged that the write information is stored in the second nonvolatile memory area, the flow goes to step S32.

In step S32, the write information of the second nonvolatile memory area is transferred to the hard disk, and the flow goes to step S33.

In step S31, when it is judged that the write information is not stored in the second nonvolatile memory area, the flow goes directly to step S33.

In step S33, the power is cut off to end the flow.

Figure 10:
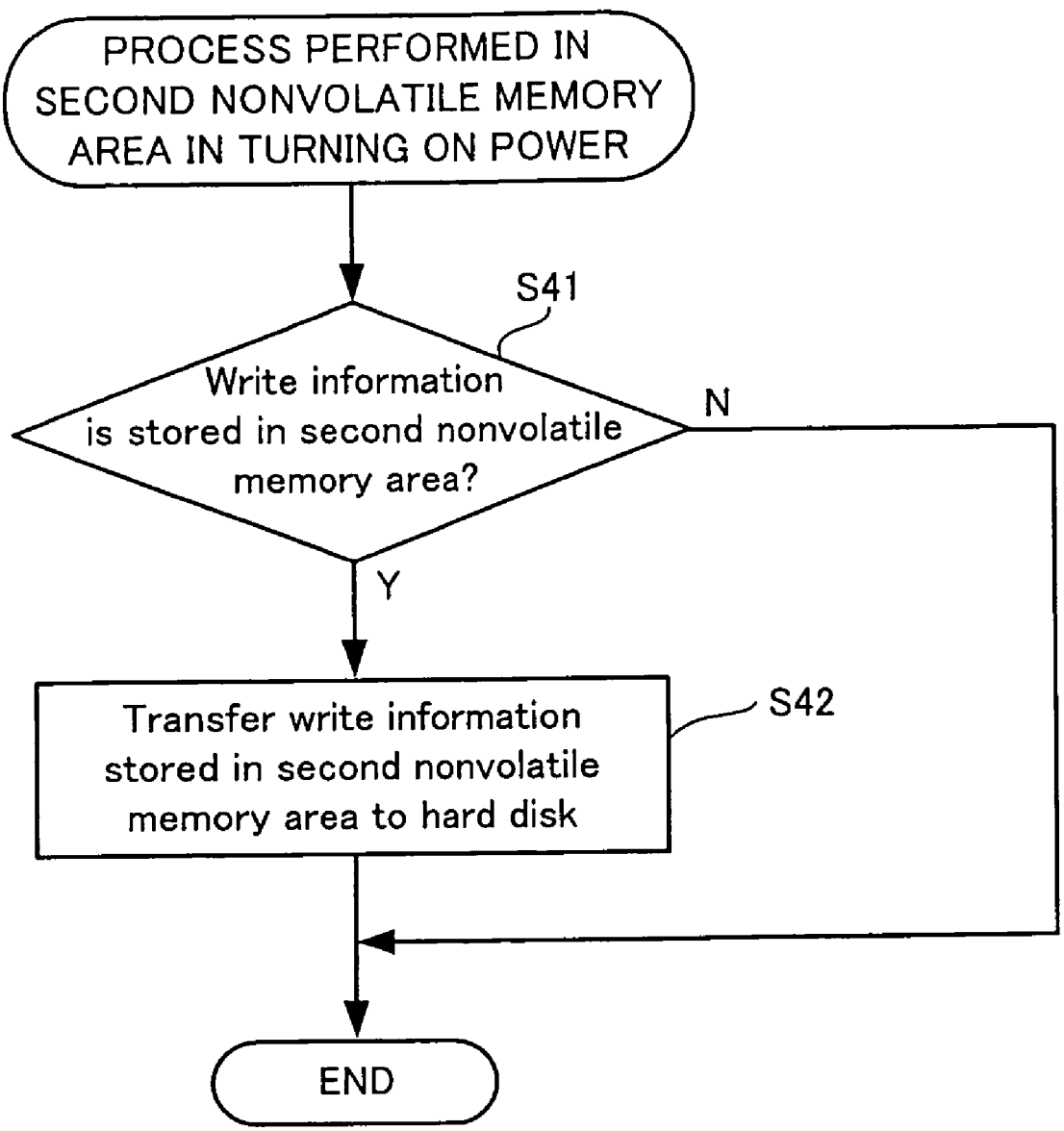
FIG. 10 is a flowchart showing a process performed in the second nonvolatile memory area when the power is turned on in the hard disk apparatus of FIG. 3.

FIG. 10 is a flowchart showing a process performed in the second nonvolatile memory area when the power is turned on in the hard disk apparatus of FIG. 3.

This process is performed, when the power of the notebook PC 10 into which the hard disk apparatus 43 of FIG. 3 is incorporated is turned on.

In step S41, the operation start processing unit receives a predetermined operation start event from the CPU to judge whether or not the write information is stored in the second nonvolatile memory area. When it is judged that the write information is stored in the second nonvolatile memory area, the flow goes to step S42.

In step S42, the write information of the second nonvolatile memory area is transferred to the hard disk, and the flow is ended.

In step S41, when it is judged that the write information is not stored in the second nonvolatile memory area, the flow is directly ended.

Thus, in the hard disk apparatus 43 of FIG. 3 which is of the embodiment of the second hard disk apparatus according to the invention, when the write information is stored in the second nonvolatile memory area 432 in turning off the power, the write information is transferred to the hard disk 101. When the write information is stored in the second nonvolatile memory area 432 in turning on the power, the write information is transferred to the hard disk 101. Even when the power is turned off because the power cord is mistakenly removed or the battery voltage is decreased and thus, the electric power necessary for the power turn-off process cannot be supplied to the hard disk apparatus 43 and the information cannot be transferred to the hard disk 101 or the transfer is interrupted, the write information stored in the second nonvolatile memory area 432 can be transferred to the hard disk 101 after the hard disk 101 has reached a steady state of a predetermined number of revolutions since the power is turned on. In the conventional process performed in the hard disk apparatus including the volatile memory in which the write information is stored, when the power is turned on again, information on the hard disk is read to confirm the contents after the hard disk is stably rotated at the predetermined number of revolutions, and necessary information is written in the buffer memory from the outside. Accordingly, such conventional process is not required in the hard disk apparatus 43, and thus start-up time shortening and low power consumption can be achieved.

In the embodiments, the hard disk apparatus incorporated into the notebook PC is described by way of example. However, the invention is not limited thereto, but the invention can be applied to any hard disk apparatus being incorporated into or connected to a device to make access to a disk in which information including boot information necessary to start up the device is written and read during the rotation of the disk by rotating the disk while freely stopping the disk.

In the embodiments, the electronic apparatus of the invention is applied to the notebook PC by way of example. However, the invention is not limited to thereto, but the electronic apparatus of the invention can generally be applied to any electronic apparatus including a disk apparatus making access to a disk in which information is written and read by rotating the disk while freely stopping the disk, the electronic apparatus being started up with boot information read from the disk apparatus in which the boot information necessary to start up the electronic apparatus is written.

What is claimed is:

1. A disk apparatus which is incorporated into or connected to a device to make access to a disk during rotation of the disk by rotating the disk while freely stopping the disk, information including boot information necessary to start up the device being written and read in the disk, the disk apparatus comprising:

a nonvolatile memory in which the boot information is stored;

an operation stop processing section which reads, upon receipt of a predetermined operation stop event, the boot information stored in the disk from the disk, the operation stop processing section checking the read boot information against the boot information stored in the nonvolatile memory, the operation stop processing section updating contents of the nonvolatile memory in order to store the same boot information as the boot information stored in the disk in the nonvolatile memory and writing flag information indicating that the same boot information as the boot information stored in the disk is stored in the nonvolatile memory when a difference exists as a result of the checking; and an operation start processing section which judges, upon receipt of a predetermined operation start event, whether or not the flag information is stored in the nonvolatile memory, the operation start processing section reading the boot information from the nonvolatile memory and starting up the device while deleting the flag information when the flag information is stored, the operation start processing section reading the boot information from the disk to start up the device and writing the boot information read from the disk in the nonvolatile memory when the flag information is not stored.

2. The disk apparatus according to claim 1, wherein the operation start processing section writes the boot information along with information indicating an address where the boot information is read on the disk when the boot information read from the disk is written in the nonvolatile memory, and the operation stop processing section refers to, upon receipt of an operation stop event, the nonvolatile memory to obtain the information indicating the address where the boot information is stored in the disk, the operation stop processing section reading the boot information stored in the disk from the address of the disk.

3. The disk apparatus according to claim 1, wherein, when an address where the boot information is stored in the disk is changed, the operation stop processing section stops working for rewriting the boot information stored in the nonvolatile memory into the same boot information as the boot information stored in the disk, and deletes the flag information or maintains the flag information in the deleted state.

4. The disk apparatus according to claim 1, wherein the boot information is comprised of master boot record information, boot sector information, and kernel information.

5. An electronic apparatus including a disk apparatus which makes access to a disk by rotating the disk while freely stopping the disk, information being written and read in the disk, the electronic apparatus being started up by boot information read from the disk apparatus in which the boot information necessary to start up the disk apparatus is stored, wherein the disk apparatus includes:
a nonvolatile memory in which the boot information is stored;
an operation stop processing section which reads, upon receipt of a predetermined operation stop event, the boot information stored in the disk from the disk, the operation stop processing section checking the read boot information against the boot information stored in the nonvolatile memory, the operation stop processing section updating contents of the nonvolatile memory in order to store the same boot information as the boot information stored in the disk in the nonvolatile memory and writing flag information indicating that the same boot information as the boot information stored in the disk is stored in the nonvolatile memory when a difference exists as a result of the checking; and
an operation start processing section which judges, upon receipt of a predetermined operation start event, whether or not the flag information is stored in the nonvolatile memory, the operation start processing section reading the boot information from the nonvolatile memory and starting up the device while deleting the flag information when the flag information is stored, the operation start processing section reading the boot information from the disk to start up the device and writing the boot information read from the disk in the nonvolatile memory when the flag information is not stored.

6. The electronic apparatus according to claim 5, wherein the operation start processing section writes the boot information along with information indicating an address where the boot information is read on the disk when the boot information read from the disk is written in the nonvolatile memory, and the operation stop processing section refers to, upon receipt of the operation stop event, the nonvolatile memory to obtain the information indicating the address where the boot information is stored in the disk, the operation stop processing section reading the boot information stored in the disk from the address of the disk.

7. The electronic apparatus according to claim 5, wherein, when an address where the boot information is stored in the disk is changed, the operation stop processing section stops working for rewriting the boot information stored in the nonvolatile memory into the same boot information as the boot information in the disk, and deletes the flag information or maintains the flag information in the deleted state.

8. The electronic apparatus according to claim 5, wherein the boot information is comprised of master boot record information, boot sector information, and kernel information.

* * * * *